United States Patent
Gupta et al.

(10) Patent No.: US 9,529,788 B1
(45) Date of Patent: Dec. 27, 2016

(54) SYSTEM FOR ASSISTING CREATION OF MESSAGES BY PROVIDING SELECTABLE TEMPLATES

(71) Applicants: Nidhi Gupta, Los Altos, CA (US); Jeff Ligh, Sunnyvale, CA (US); Song SunMin Sunny, Los Altos, CA (US)

(72) Inventors: Nidhi Gupta, Los Altos, CA (US); Jeff Ligh, Sunnyvale, CA (US); Song SunMin Sunny, Los Altos, CA (US)

(73) Assignee: ELANCE, INC., Mountain View, CA (US)

( * ) Notice: Subject to any disclaimer, the term of this patent is extended or adjusted under 35 U.S.C. 154(b) by 326 days.

(21) Appl. No.: 13/652,357

(22) Filed: Oct. 15, 2012

(51) Int. Cl.
*G06F 17/00* (2006.01)
*G06F 17/21* (2006.01)
*G06F 17/24* (2006.01)

(52) U.S. Cl.
CPC .......... *G06F 17/243* (2013.01); *G06F 17/212* (2013.01); *G06F 17/248* (2013.01)

(58) Field of Classification Search
CPC .... G06F 17/248; G06F 17/243; G06F 17/212; G06F 17/211
See application file for complete search history.

(56) References Cited

U.S. PATENT DOCUMENTS

| | | | |
|---|---|---|---|
| 8,626,769 B1 | 1/2014 | Bhatt | |
| 8,645,817 B1* | 2/2014 | Fisher | 715/243 |
| 2002/0035487 A1* | 3/2002 | Brummel et al. | 705/3 |
| 2004/0117361 A1* | 6/2004 | Greer | G06F 17/30321 |
| 2005/0246627 A1* | 11/2005 | Sayed | G06F 17/248 |
| | | | 715/234 |
| 2005/0257148 A1 | 11/2005 | Goodman et al. | |
| 2007/0054248 A1* | 3/2007 | Bare | G06Q 10/00 |
| | | | 434/219 |
| 2011/0145101 A1* | 6/2011 | Berger et al. | G06F 17/30867 |
| | | | 715/764 |
| 2011/0157609 A1* | 6/2011 | Brady et al. | 715/208 |
| 2011/0197119 A1* | 8/2011 | Ye | G06Q 50/22 |
| | | | 715/226 |

(Continued)

OTHER PUBLICATIONS

Ali, A. et al. Predictive Models of Form Filing. Microsoft Research, Tech.Rep. MSR-TR-2009-1, 2009, Redmond, WA.

(Continued)

*Primary Examiner* — Ariel Mercado
(74) *Attorney, Agent, or Firm* — Haverstock & Owens LLP

(57) ABSTRACT

Embodiments of the present invention are directed to a system for assisting creation of messages by providing selectable templates. The system includes an application configured to provide a form which receives information. The form is configured based on a template, such as a default template or an alternate template. A user is able to switch between templates any time during the process of completing the form. The templates share one or more common fields. The application is configured to persist user data associated with at least one of the one or more common fields. The application is also configured to refresh/update the form with relevant fields and editable content associated with a template, and any persisted user data upon selection of that template. In some embodiments, the alternate templates include templates based on posts previously completed by the user and/or canned templates which are category-specific.

20 Claims, 7 Drawing Sheets

(56) References Cited

U.S. PATENT DOCUMENTS

2011/0209068 A1     8/2011  Vemuri
2012/0110432 A1*    5/2012  Mei et al. .................... 715/233
2013/0061119 A1*    3/2013  Jackson ....................... 715/206
2013/0268451 A1*   10/2013  Pendyala et al. ............ 705/321

OTHER PUBLICATIONS

Toda, G., et al. "A Probabilistic Approach for Authomatically Filling Form-Based Web Interfaces." Proceedings of the VLDB Endowment 4.3 (2010): 151-150.
Office Action for Application mailed on Apr. 8, 2015 U.S. Appl. No. 13/652,378, filed Oct. 15, 2012, Chiu et al.
Notice of Allowance from the U.S. Patent Office, U.S. App. No. 13/652,378, filed Oct. 15, 2012, First Named Inventor: Kwan-Min Chiu, Date Mailed Jul. 8, 2015, pp. 15.

\* cited by examiner

200

Describe Your Job

Describe the job or list the skills you're looking for.

Name Your Job
205

Describe It  Need help? Browse our Job Templates. — 245
210

215 — Add Attachment

Select the Category of Work
220 — - Select Category -

Request Specific Skills or Groups (optional)

225 — Select a category first in the section above.

Select a Category First

230 — What is the work arrangement?
  ⦿ Hourly   ○ Fixed Price

[Part Time] [Enter #] hrs/week for [3-4 weeks]

What is your budget?
235 — - Select -

240 — Privacy and Other Options - Show ⌄

250 — [Continue]   [Save & Post Later] — 255

Fig. 2A

Privacy and Other Options - Hide ⌃

Job Location
260 — ◉ No preference
○ Preferred Location

265 — Post this job for
[15 days]

270 — Proposed Start Date
◉ Start immediately after proposal is selected.
○ Job will start on [ ]

275 — Job Posting Visibility
◉ Public -- Visible to everyone in the Elance community.
☑ Get more proposals. Allow search engines like Google to view this post.

○ Private -- Do not show on Elance jobs list. Only contractors I invite can response.

280 — 1099 Tax Filing (US only)
☑ Yes. I am based in the U.S. If I decide to choose a contractor from the U.S. for my job, automatically file the 1099 tax form for me. More Info

Job Templates ✕

305 — Reuse your previous jobs — browse all »

[📝] JART Website Project
Project

310 — Most popular job templates — browse all » — 315

[📝] Logo Design Project
Project

[📝] WordPress Themes Project
Project

[👤] Web Developer
Position 1 2 3

Describe Your Job
Describe the job or list the skills you're looking for.

Name Your Job
405

Briefly describe your business   475   Undo

410

415 Add Attachment

What type of logo are you looking for?
Below are a few examples of popular logo styles to help you make your decision

| Word mark | Letterform | Pictoral/Graphical |
|---|---|---|
| NewCo | | NEWCO |

| Abstract | Emblem | Mascot/Character |
|---|---|---|
| NEWCO | NEWCO | |

420 Wordmark

Do you have any preferred colors?
Common color associations:
Red: Love, Passion, Vigor, Courage, Anger
Yellow: Cheer, Joy, Freshness, Lightheartedness
Orange: Enthusiasm, Fascination, Happiness, Creativity
Green: Growth, Health, Peace, Safety, Success
Blue: Stability, Trust, Loyalty, Confidence, Faith
Black: Mystery, Power, Elegance, Unknown, Fear
Purple: Royalty, Nobility, Luxury, Ambition
White: Innocence, Purity, Cleanliness, Simplicity

425

What type of style are you looking for?
Suggestions: Corporate, Clean, Modern, Classic, Noisy, Fun, Funky, Elegant, High Tech

430

Any additional comments?

435

480

Job Templates   485
Selected job template

Logo Design Project   [x]
Project

Reuse your previous jobs   browse all »

JART Website Project
Project

Most popular job templates   browse all »

Logo Design Project
Project

WordPress Themes Project
Project

Web Developer
Position

Fig. 4A

440a — Design & Multimedia   ⌄        Logos   ⌄ — 440b

Request Specific Skills or Groups (optional)

445 —
| Enter the skills you are looking for in a contractor. |
| 3d |
| After Effects |
| Animation |
| Art Direction |

Selected Skills (max5)
| Logo Design [x] |

What is the work arrangement?
450 —  ○ Hourly    ⦿ Fixed Price

What is your budget?
455 — | - Select - |

460 — Privacy and Other Options - Show ⌄

465 — [ Continue ]   [ Save & Post Later ] — 470

Describe Your Job
Describe the job or list the skills you're looking for.

Name Your Job
505 — php developer

580 — Undo
Briefly describe your business

570 —

515 — Add Attachment

Job description:
575 —
We are looking for a Web Developer who will be responsible for...

Your responsibilities:

- Review business requirements
- Perform analyses technical
- Write clean, modular, dynamite code

Select the Category of Work
520 — Web & Programming | Web Programming

Request Specific Skills or Groups (optional)

525 —
.NET
ABAP
Acrobat
ActionScript

Selected Skills (max 5)
CSS [x]
HTML [x]
JavaScript [x]
PHP [x]

What is the work arrangement?
530 —
⦿ Hourly   ○ Fixed Price

Part Time | Enter # | hrs/week for | 3-4 weeks

What is your budget?
535 — - Select -

540 — Privacy and Other Options - Show ⌄

550 — [ Continue ]  [ Save & Post Later ] — 555

560
Job Templates
585
Selected job template
Web Developer Position [x]

Matching Job Templates   browse all »
Web Developer Position

[ browse all » ]

Reuse your jobs as templates. Browse them now »

Fig. 5B

SYSTEM FOR ASSISTING CREATION OF MESSAGES BY PROVIDING SELECTABLE TEMPLATES

FIELD OF THE INVENTION

The present invention relates to an improved system for assisting creation of messages, which provides selectable templates pertinent to different industries.

BACKGROUND OF THE INVENTION

Users today are able to utilize applications that provide them with forms to complete for creating posts, such as job posts. These applications, however, provide only a single form for employers to fill out, regardless of the type of job it is. There are drawbacks to this prior art one-form-fits-all model. First, the prior art form is simply a generic form. It typically has a single field for an employer to describe details of a job. Since the job description field is a general field, which does not provide the employer with any guidance on how to complete the field, the employer may not know how to effectively describe the job, may inadvertently fail to describe certain details of the job that may be crucial to an employee when searching and applying for jobs, or both. Sometimes the failure to provide aspects of the job will result in the job posting being returned at a bottom of a search return list, if it is returned at all. Further, even if the employer precisely describes the job in the job description field, details regarding the job can be easily overlooked by employees. Details can escape even the most attentive employee reading the job post simply because the description is simply too long and/or not organized.

The present invention addresses at least these limitations in the prior art.

SUMMARY OF THE INVENTION

Embodiments of the present invention are directed to a system for assisting creation of messages, such as job posts, by providing selectable templates. The system includes an application configured to provide a form which receives information. The form is configured based on a template, such as a default template or an alternate template. A user is able to switch between templates any time during the process of completing the form. The templates share one or more common fields. The application is configured to persist user data associated with at least one of the one or more common fields. The application is also configured to refresh/update the form with relevant fields and editable content associated with a template, and any persisted user data upon selection of that template. In some embodiments, the alternate templates include templates based on posts previously completed by the user and/or canned templates which are category-specific. The invention is described relative to templates for posting jobs. However, the invention can be applied to other types of messages. The templates feature of the present invention advantageously helps users post better, more-detailed descriptions of jobs faster than before.

In one aspect, a system includes a processor and an application executed by the processor. The application is typically configured to provide a form for receiving information, provide a default template to configure the form, provide at least one alternate template, allow for switching between the default template and one of the at least one alternate template, and reconfigure the form based on a selected template.

An alternate template can be based on data previously provided by a user. In some embodiments, the data previously provided by the user relates to a job post previously completed by a user. An alternate template can also be based on a specific job and includes fields that are specific to the job. Fields in the alternate template are static, dynamic, or both. At least a portion of the fields in the alternate template is populated with editable content.

In some embodiments, the application is also configured to suggest at least one recommended template based on user input for one or more default fields. Each recommended template is an alternate template. Each alternate template can have one or more fields that are different from other alternate templates.

In some embodiments, the application is also configured to create and save a custom template, and to provide the custom template as an alternate template. In some embodiments, the application is also configured to upload at least one document. In some embodiments, the application is also configured to publish a job post after required fields in a template are completed by a user.

In another aspect, a system is for providing a template to be completed by a user. The system includes a processor and an application executed by the processor. The application is typically configured to provide a form based on a first template of a plurality of templates. Typically, the templates share one or more fields. The application is typically configured to persist user data associated with at least one of the one or more fields, and refresh the form based on a second template selected from the plurality of templates and the user data. In some embodiments, the form is viewable as a web page.

In yet another aspect, a non-transitory computer-readable medium storing instructions that, when executed by a computing device, cause the computing device to perform a method. The method includes presenting a form with a default template, displaying a list of at least one identifier associated with an alternate template, and updating the form with an alternate template selected by a user.

In some embodiments, the form is automatically updated with the alternate template when an identifier associated with the alternate template is selected. The default template and the alternate template typically have one or more common fields. In some embodiments, the method includes translating data associated with at least one of the one or more common fields between templates, and automatically populating one or more fields with editable content. In some embodiments, the method includes updating the list after a portion of the default template is filled out.

A user interface of the form can be command language based, direct manipulations based or a combination thereof.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

FIGS. 2A-2B illustrate a job post form based on an exemplary default template in accordance with the present invention.

FIG. 3 illustrates an exemplary collection of alternate templates in accordance with the present invention.

FIGS. 4A-4B illustrate a job post form based on an exemplary Logo Design Project template in accordance with the present invention FIGS. 5A-5B illustrate a process of updating a job post form based on an exemplary Web Developer template in accordance with the present invention.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein or with equivalent alternatives.

Embodiments of the present invention are directed to a system for assisting creation of messages, such as job posts, by providing selectable templates. The system includes an application configured to provide a form which receives information. The form is configured based on a template, such as a default template or an alternate template. A user is able to switch between templates any time during the process of completing the form. The templates share one or more common fields. The application is configured to persist user data associated with at least one of the one or more common fields. The application is also configured to refresh/update the form with relevant fields and editable content associated with a template, and any persisted user data upon selection of that template. In some embodiments, the alternate templates include templates based on posts previously completed by the user and/or canned templates which are category-specific. The invention is described relative to templates for posting jobs. However, the invention can be applied to other types of messages. The templates feature of the present invention advantageously helps users post better, more-detailed descriptions of jobs faster than before.

Figure 1:
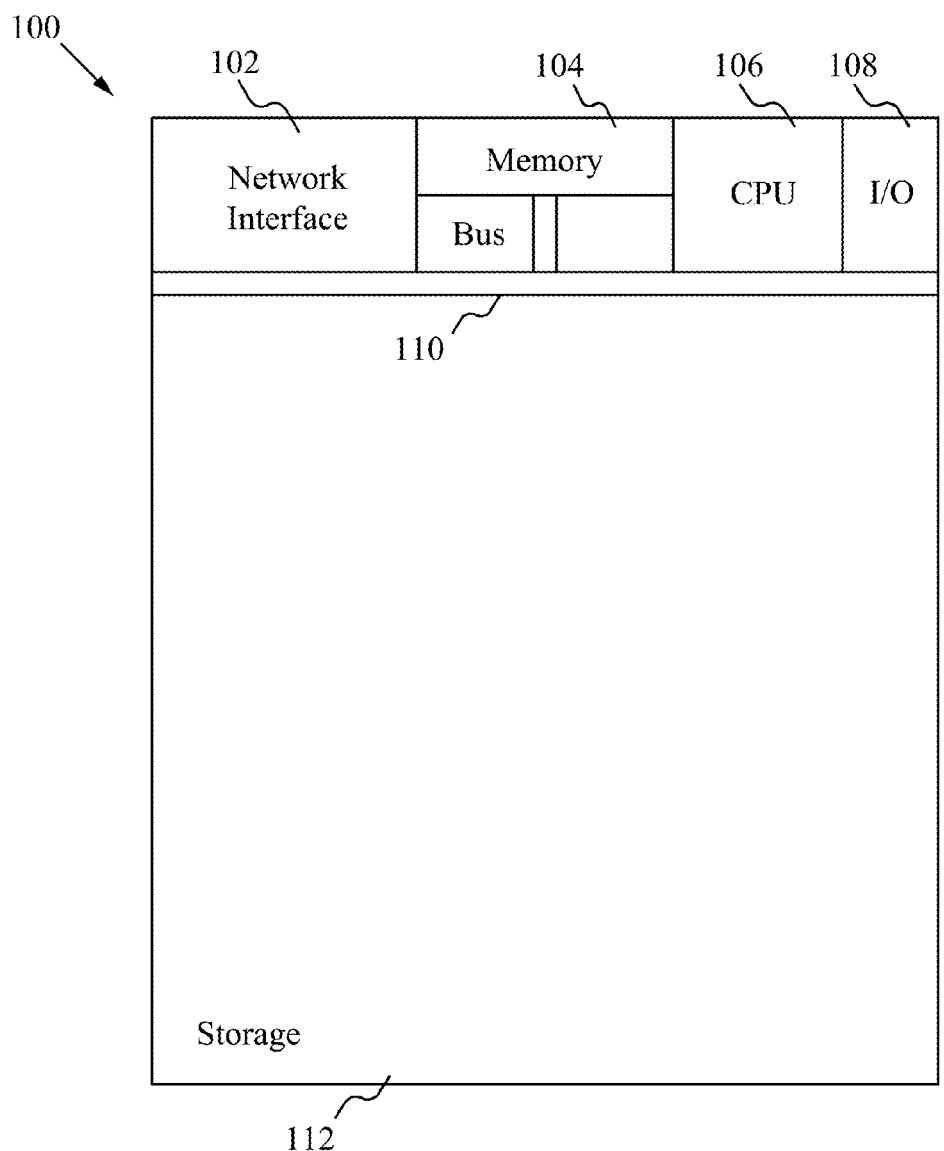
FIG. 1 illustrates a graphical representation of an exemplary computing device in accordance with the present invention.

FIG. 1 illustrates a graphical representation of an exemplary computing device 100 in accordance with the present invention. The computing device 100 is able to serve, compute, communicate, generate and/or display job posts created by employers. For example, a computing device 100 is able to host a website which stores and serves information related to jobs.

In general, a hardware structure suitable for implementing the computing device 500 includes a network interface 102, a memory 104, processor 106, I/O device(s) 108, a bus 110 and a storage device 112. The choice of processor is not critical as long as the processor 106 has sufficient speed. The memory 104 is any conventional computer memory known in the art. The storage device 112 is a hard drive, CDROM, CDRW, DVD, DVDRW, flash memory card or any other storage device. The computing device is able to include one or more network interfaces 102. An example of a network interface includes a network card connected to an Ethernet or other type of LAN. The I/O device(s) 108 are able to include one or more of the following: keyboard, mouse, monitor, display, printer, modem and other devices. Software applications are likely to be stored in the storage device 112 and memory 104 and are executed by the processor 106. Software applications include an application configured to assist in creation of a message, such as a job post.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device. If there is a set of servers, they can be co-located or geographically dispersed.

A job post form of the present invention is based on one of a plurality of templates, including a default template and one or more alternate templates. In some embodiments, the job post form is accessible on a web page of a browser on an Internet-ready client device. In addition to or alternatively, the job post form is accessed using a native application running on an Internet-ready client device.

As discussed above, the job post form of the present invention is based on a default template or one or more alternate templates. FIG. 2A illustrates a job post form based on an exemplary default template 200 in accordance with the present invention. Although the job post form is first based on the default template 200, a user filling out the job post form, such as an employer, is able to subsequently select a more suitable template to use from the one or more alternate templates. Details regarding the alternate templates are discussed below.

As illustrated in FIG. 2A, the job post form based on the default template 200 includes a plurality of fields that aids the employer in describing a job. The fields include a job title field 205, a generic description field 210, a job category selector 220, a skills field 225, a work arrangement field 230, a budget field 235, and privacy and other options 240. The job post form 200 also has a file attachment feature 215 and an alternate templates link 245.

The job title field 205 allows the employer to name the job. The generic description field 210 allows the employer to describe the job. The job category selector 220 allows the employer to categorize the job. In some embodiments, after the employer selects a category of work using the job category selector 220, the employer is able to select a sub-category to further define or classify the job. In some embodiments, a list of skills pertaining to the category is automatically listed upon the employer selecting a category. In some embodiments, the list of skills is determined using a machine learning algorithm, which is discussed in the co-pending U.S. application Ser. No. 13/652,378, entitled "A SYSTEM FOR ASSISTING CREATION OF A MESSAGE BY AUTOMATICALLY RECOMMENDING DATA TO BE INCLUDED THEREIN," which is hereby incorporated by reference in its entirety. The employer is able to choose among the skills listed to include in the skills field 225. Alternatively or in addition to, the employer is able to add skills not listed in the skills field 225. In some embodiments, the user can only include a maximum number of skills in the skills field 225 and/or the user must include a minimum number of skills in the skills field 225. Alternatively, the skills field 225 is simply an optional field.

The work arrangement field 230 indicates whether the job is an hourly job or a fixed price job. An hourly job typically pertains to a ongoing work where the job requires flexibility. A fixed price job typically pertains to a job where the scope of work is well defined.

The file attachment feature 215 allows the employer to upload one or more files associated with the job. In some embodiments, the user can only upload a maximum number of files. In some embodiments, there is a file size limit for each attachment. The files uploaded can help clarify the job requirements and enable prospective employees to prepare more thorough, relevant proposals.

Although not required, the employer can provide additional information under privacy and other options 240, as shown in FIG. 2B. For example, additional information can include a job location field 260, a post time frame field 265, a start date field 270, a job posting visibility option 275, and a 1099 tax filing option 280.

It should be understood that the fields are not limited to those shown in FIGS. 2A-2B (e.g., the job title field 205, the generic description field 210, the job category selector 220, the skills field 225, the work arrangement field 230, and the budget field 235, and privacy and other options 240) but can include other generic fields. After the employer has completed filling out the job post form, the employer has the option to continue with the posting of the job via button 250 or the option to save the job post form for a later posting via button 255. If the employer activates button 250, the job post is subsequently published, for example on the Internet, and made available for searching and viewing by those looking for jobs, such as an employee. In some embodiments, the employer is able to first review and make changes to the job post before it is published. If the employer activates button 255, data associated with the fields are saved in and are retrievable from a datastore when the employer returns to the job post form.

If the employer activates the templates link 245, as illustrated in FIG. 2A, the employer is presented with the one or more alternate templates from which the employer is able to choose a more suitable template to use. FIG. 3 illustrates an exemplary collection 300 of alternate templates in accordance with the present invention. The collection 300 can appear within the same page as the job post form or a separate pop-up window. The collection 300 can be closed, minimized/maximized, or both.

In some embodiments, the collection 300 of alternate templates is divided into two sections. A first section 305 includes any job postings previously created by the employer, each typically in the form of a clickable identifier such that when activated, retrieves the corresponding template. For example, the identifier "JART Website Project" is clickable. A second section 310 includes different canned templates, each typically in the form of a clickable identifier such that when activated, retrieves the corresponding template. For example, the identifier "Logo Design Project" is clickable. Each canned template pertains to and is based on a specific category, such as a job. Since a job is either project-based or position-based, each template shown in the collection 300 is indicated as either project-based or positioned-based. As shown in FIG. 3, a project-based job is exemplarily indicated as a clipboard with a pen, while a position-based job is exemplarily indicated as a person. Different designations are contemplated. As discussed elsewhere, a project-based job is rather short lived as compared to a position-based job.

In some embodiments, an alternate template can include one or more unique fields specific to the corresponding category (e.g., job). In some embodiments, an alternate template can have one or more fields that are different from the other alternate templates. In some embodiments, all templates can have one or more common fields. A common field, such as the job title field, is a field shared by all templates.

In FIG. 3, the first section 305 of the collection 300 includes the clickable identifier "JART Website Project" which, when activated, retrieves the JART Website Project template. In this example, the JART Website Project template is a previous job post form completed by the employer. When the employer selects the clickable identifier "JART Website Project" from the collection 300, the job post form automatically refreshes based on the JART Website Project template. In some embodiments, data associated with fields of the JART Website Project template are retrieved and pre-populated in the job post form. The employer is able to use this previous job post as a template to create the current job post, saving time needed to create the current job posting. The employer is able to edit or modify the content of the fields. Typically, the employer will use a previous job post as a template if the current job is similar to the previous job. The templates in the first section 305 can be listed based on an order, such as date of creation, frequency of selection or alphabetical.

Also in FIG. 3, the second section 310 of the collection 300 includes clickable identifiers of popular alternate templates, such as but not limited to a Logo Design Project template, a WordPress Project template and a Web Developer template. However, the employer is able to click on the Browse All link 315 to view all canned templates. The employer is able to view the canned templates based on an order, such as alphabetical or popularity. In addition, the employer is able to narrow the selection to simply view only those that are project-based or only those that are position-based. The clickable identifiers in the second section 310 are similarly configured as the clickable identifier in the first section 305.

In some embodiments, the canned templates include, but are not limited to, templates for .NET software framework Developer, 3D Animator, AJAX programming language Developer, ASP server-side scripting environment Developer, ASP .NET open source server-side Web application framework Developer, ACTIONSCRIPT programming language Developer, AMAZON WEB SERVICES application service provider Developer, ANDROID operating system Developer, Animator, Article Writer, Article and Written Content Project, Banner Ad Design Project, Banner Ad Designer, BLACKBERRY wireless devices Developer, Blogger, Brochure Design Project, Brochure Designer, Business Card Design Project, Business Card Designer, Business Writer, CSS Developer, Cartoonist, Content Management System, Content Moderator, Copywriter, Corporate Brand Designer, Cover Designer, Creative Writer, Customer Service Agent, Data Entry Specialist, Database Developer, DRUPAL content management platform Developer, Ecommerce Developer, Editor, FACEBOOK social utility Developer, FLASH plugin Animator, Ghostwriter, GOOGLE Internet-related services Website Optimizer Developer, Graphic Designer, HTML Developer, HTML5 Developer, Illustrator, JAVA programming language Developer, JAVASCRIPT programming language Developer, JOOMLA! content management system Developer, Label and Package Designer, LINUX operating system Developer, Logo Design Project, Loge Designer, MAGENTO e-commerce software and platform Developer, Marketing Writer, Mobile Application Developer, MYSQL database management system Developer, Newsletter Designer, OBJECTIVE-C programming language Developer, PHP programming language Developer, PAYPAL digital wallet based e-commerce business Developer, Presentation Designer, RUBY ON RAILS web application framework Developer, SQL language for accessing databases Developer, SQL language for accessing databases Server Developer, Social Networking Developer, Technical Writer, Translation Project, Video Editor, Video Producer, Virtual Assistant, Web Content Creator, Web Designer, Web Developer, Web Services Developer, Website Design Project, WORDPRESS web software Designer, WORDPRESS web software Theme Project, XHTML markup language Developer, XML markup language Developer, IOS operating system Developer, IPAD tablet Developer, IPHONE mobile phone Developer, and JQUERY Developer.

In some embodiments, as the employer mouses over an alternate template shown in the collection 300, a description of that template is shown. Once the employer selects a clickable identifier of an alternate template, the job post form is automatically updated and is associated with the corresponding category (e.g., job) defined by that alternate template. The format and fields of the job post form are thus changed accordingly. The fields of the job post form are typically pertinent to that job.

For example, FIGS. 4A-4B illustrate the job post form based on an exemplary alternate template 400 in accordance with the present invention. A first part of the job post form is shown in FIG. 4A, and a second part of the job post form is shown in FIG. 4B. As shown in FIGS. 4A-4B, the alternate template 400 is the Logo Design Project template. The job post form includes a plurality of fields that are configured to aid the employer in thoroughly describing a logo design project. The plurality of fields includes common fields and unique fields to logo design. The job post form also includes a file attachment feature 415, which is similarly configured as the attachment feature 215.

Unique fields are fields that are specific to a job (e.g., the logo design project). The unique fields specific to a logo design project include a business description field 410, a logo type field 420, a colors field 425, a style field 430 and a comments field 435. For example, different logo formats are provided and include a word mark format, a letterform format, a pictorial/graphic format, an abstract format, an emblem format and a mascot/character format, from which the employer selects one.

As discussed above, common fields are fields shared among all templates. In some embodiments, the common fields include a job title field 405, a job category and subcategory selectors 440a, 440b, a skills field 445, a work arrangement field 450, a budget field 455, and privacy and other options 460 of the job post form 400, which are similar to the job title field 205, the job category and subcategory selectors 220, the skills field 225, the work arrangement field 230, the budget field 235, and the privacy and other options 240 of the job post form 200, respectively.

In some embodiments, an alternate template can include suggestions that, for example, help the employer make a decision regarding how they want their logo to look like or help the employer give a more detailed description of their logo. Referring back to FIG. 4A, the Logo Design Project template provides information regarding different logo formats, different styles, and different colors and associations. Continuing with the example, the Logo Design Project template provides the following style suggestions: Corporate, Clean, Modern, Classic, Noisy, Fun, Funky, Elegant, High Tech. For another example, the Logo Design Project template provides the following color suggestions:

Red: Love, Passion, Vigor, Courage, Anger
Yellow: Cheer, Joy, Freshness, Lightheartedness
Orange: Enthusiasm, Fascination, Happiness, Creativity
Green: Growth, Health, Peace, Safety, Success
Blue: Stability, Trust, Loyalty, Confidence, Faith
Black: Mystery, Power, Elegance, Unknown, Fear
Purple: Royalty, Nobility, Luxury, Ambition
White: Innocence, Purity, Cleanliness, Simplicity In some embodiments, certain fields are automatically pre-populated with editable content upon association of the job post form with the corresponding category (e.g., job). Editable content is typically relevant to the category. For example, now referring to FIG. 4B, the skills field 445 is automatically pre-populated with skills typically associated with the logo design project. The skills automatically pre-selected are skills necessary to perform the job, skills likely to be possessed by the employee, and/or skills required by the employer. Although the skills are automatically pre-selected, the pre-selected skills can be removed and other skills can be added to the skills field 445 as the employer sees fit. In FIG. 4B, the automatically pre-selected skill is Logo Design, which can be removed from the skills field 445.

The skills field is an important field because skills are typically a way to discover talent. Put differently, skills are needed for matching prospective jobs with an employee during a job search. If an employer filling out a prior art job post form unintentionally leaves the skills field empty or omits certain skill(s), then the job post may never be viewed by target employees. In particular, although the job post is published, the job post may not be returned as part a job search. Since skills typically associated with a job are advantageously pre-selected in accordance with the present invention, the job post will be relevantly returned as part of a job search even if the employer inadvertently fails to review the skills field before publishing the job post. As discussed above, the pre-selected skills are simply suggestions and can be removed. The employer is able to add from a list of additional skills to the skills field. In addition or alternatively, the employer is able to add a skill not from the list by typing in the skills. Similarly, other fields that are relevant to and/or used as part of a job search are able to be pre-populated with editable content In some embodiments, other fields are also automatically pre-populated with editable content upon association with the job post form with a category. For example, once the employer selects a Copywriter template, the job description field is pre-populated with the following exemplary editable content:

"We're looking for a Copywriter and/or Content Creator who knows how to create stories that make an impact and leave a lasting impression with a variety of audiences. Here's what you need to know.

Your responsibilities:
Develop content themes based on the direction and creative brief provided by our team
Write creative copy including headlines, tag lines, positioning statements and feature copy for articles, web content, emails, training materials, direct marketing materials and more
Ad-hoc writing and marketing projects as they arise Your qualifications:
Previous experience in creative writing, literature, journalism, or copywriting
Fluent English including excellent writing, grammar, spelling and formatting
Expertise in web copy, SEO, and online (email) marketing a plus
An exceptional portfolio that demonstrates an ability to create compelling copy for a wide variety of brands, audiences and industries
Ability to take constructive criticism
A work style that is extremely detail oriented
The drive, flexibility and passion to work independently and thrive in a remote-work environment
A complete Elance profile
References or an established reputation on Elance preferred"

Automatically pre-populated, editable content is simply content that assists the employer to better describe the job.

Although editable content can be modified, replaced or even deleted, the pre-populating feature of the present invention advantageously minimizes the amount of work the employer needs to do when completing a job form post.

In some embodiments, some fields of a job post form are optional (e.g., need not be completed), while other fields of the job post form need to be completed. In some embodiments, some fields the job post form are dynamic (e.g., new fields are generated or added depending on user inputs), while others fields of the job post form are static.

In some embodiments, the employer is able to remove the alternate template currently in use to revert back to original text and selections by activating an Undo link 475 or a close button 485 in the collection 480 of alternate templates. In some embodiments, the Undo link 475 and the close button 485 revert the job post form to the previous template. In some embodiments, the Undo link 475 and the close button 485 revert the job post form to the default template.

In some embodiments, the employer is able to switch between templates, such as by clicking on the clickable identifier "WordPress Theme Project" in the collection 480. Upon switching to another template, the job post form is updated or refreshed with new fields and some of those fields are automatically pre-populated with the corresponding editable content. In some embodiments, data associated with one or more common fields are translated from the previous template to the current template. The data associated with the one or more common fields are typically persisted to allow for translation between templates.

Figure 5A:
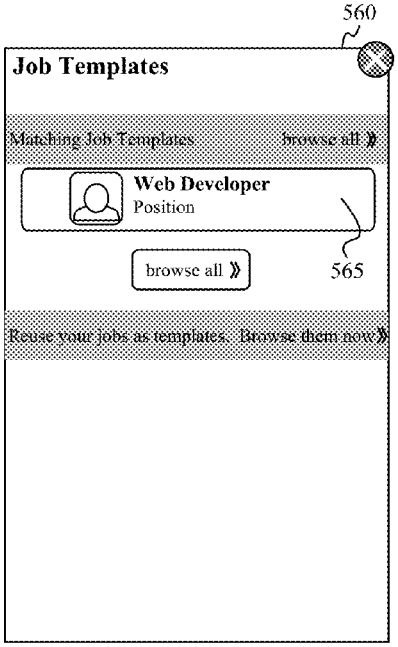

In some embodiments, after the employer has filled out a job title field of a job post form, which can be based on any template, a collection of one or more matching job templates automatically appears within the same page as the job post form or separate a pop-up window. A search algorithm is used to narrow down from the existing job templates to those that sufficiently "match" the user input. For example, as illustrated in FIGS. 5A-5B, after the employer types in "php developer" in the job title field 205 of a job post form that is based on the default template 200', the collection 560 appears showing one or more suggested templates. The one or more suggested templates include canned templates and/or previous job postings.

In FIG. 5A, the clickable identifier "Web Developer" is shown in the collection 560. Assuming the employer selects the clickable identifier "Web Developer," the job post form is updated with fields according to the Web Developer template 500. Some of the fields, such as the job title field 205, are populated with persisted user data. Persistent user data can include those associated with the work arrangement field 230, the budget field 235, and privacy and other options 240.

Specific fields associated with the Web Developer template 500 include a business description field 570 and a job description field 575. The job description field 575 is pre-populated with editable content. The job category field 520 is pre-filled. The skills field 525 is automatically pre-populated with skills necessary to perform the job, skills likely to be possessed by the employee, and/or skills required by the employer. Although the skills are automatically pre-selected, the pre-selected skills can be removed and other skills can be added to the skills field 525 as the employer sees fit. The employer is able to undo and revert back to a previous setting via the Undo link 580 or the close button 585.

In some embodiments, the employer is able to create and save custom templates as alternate templates, which can be used by the employer at a later time. The employer is able to select any field and any number of fields to be included in a custom template. In some embodiments, one or more fields are required as part of a custom template. For example, the job title field is required when creating a custom template.

In operation, the employer activates a process to create a new job post. A job post form appears. In some embodiments, the job post form is initially based on a default template. The fields in the job post form are generic. The fields typically include a job title field. The job title field is a common field since all templates have a job title field. As the employer finishes typing in the title in the job title field, a collection of suggested templates appears. The employer is able to select one of the suggested templates to use. If the employer chooses to use one of the suggested templates, the job post form is refreshed with new fields based on the selected template. In some embodiments, user data associated with one or more common fields, such as the job title field, are automatically filled in. Some fields are also automatically filled in with pre-populated content. For example, a skills field is pre-populated with selected skills. The employer can view all templates and choose another template to use. User data associated with one or more common fields and any pre-populated content are likewise automatically pre-filled in the respective fields of the new template. The employer at anytime can click back or undo to a previous template, such as the default template.

Although the user interface illustrated in the figures are shown as command language based (e.g., having fields) for accepting user input, the user interface can also or instead be direct manipulation based (e.g., having selectable icons or objects) for accepting user input. Other user input forms, such as gestures or handwriting, are contemplated.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system comprising:
   a processor; and
   an application executed by the processor, the application configured to:
   provide a form for receiving information;
   provide a default template to configure the form;
   provide at least one alternate template, wherein each alternate template is pre-identified with a category and has one or more fields that are different from other alternate templates;
   allow for switching between the default template and one of the at least one alternate template;
   reconfigure the form based on a template selected from the at least one alternate template, wherein the default template and the selected template have one or more common fields;
   translate data associated with at least one of the one or more common fields between the default template and the selected template;
   automatically populate at least one field in the selected template with editable content that includes modifiable suggestions associated with the category that the selected template is pre-identified with;
   obtaining a first group of data relating to a first field in the selected template;

using a machine learning algorithm on the first group of data to suggest a second group of ranked data;

prepopulating a second field in the selected template with the second group of ranked data, wherein the second group of ranked data is modifiable from the second field by removing at least one datum from the second field according to user input; and storing the first group of data along with the second group of data in an evolving collection of past data collected from all users.

2. The system of claim 1, wherein the at least one alternate template is based on data previously provided by a user.

3. The system of claim 2, wherein the data previously provided by the user relate to a job post previously completed by the user.

4. The system of claim 1, wherein the at least one alternate template is based on a specific job and includes fields that are specific to the job.

5. The system of claim 4, wherein at least a portion of the fields in the alternate template is static.

6. The system of claim 4, wherein at least a portion of the fields in the alternate template is dynamic.

7. The system of claim 1, wherein the application is also configured to suggest at least one recommended template based on user input for one or more default fields.

8. The system of claim 7, wherein each recommended template is an alternate template.

9. The system of claim 1, wherein the application is also configured to create and save a custom template, and to provide the custom template as an alternate template.

10. The system of claim 1, wherein the application is also configured to upload at least one document.

11. The system of claim 1, wherein the application is also configured to publish a job post after required fields in a template are completed by a user.

12. A system for providing a template to be completed by a user, the system comprising:

a processor; and an application executed by the processor, the application configured to:

provide a form based on a first template of a plurality of templates, wherein the templates share one or more fields, wherein each template is pre-identified with a category and has one or more fields that are different from other templates;

persist user data associated with at least one of the one or more fields;

refresh the form based on a second template selected from the plurality of templates;

automatically fill in the at least one of the one or more fields of the second template with the persisted user data;

automatically populate a first field in the second template with editable content that includes modifiable suggestions associated with the category that the second template is pre-identified with;

obtaining a first group of data relating to a second field in the second template;

using a machine learning algorithm on the first group of data to suggest a second group of ranked data;

prepopulating a third field in the second template with the second group of ranked data, wherein the second group of ranked data is modifiable from the third field by removing at least one datum from the third field according to user input; and storing the first group of data along with the second group of data in an evolving collection of past data collected from all users.

13. The system of claim 12, wherein the form is viewable as a web page.

14. A non-transitory computer-readable medium storing instructions that, when executed by a computing device, cause the computing device to perform a method comprising:

presenting a form with a default template;

displaying a list of at least one identifier associated with an alternate template;

updating the form with an alternate template selected by a user, wherein the default template and the alternate template have one or more common fields, wherein the alternate template is pre-identified with a category and has one or more fields that are different from other alternate templates;

translating data associated with at least one of the one or more common fields between the default template and the alternate template;

automatically populating a first field in the alternate template with editable content that includes modifiable suggestions associated with the category that the alternate template is pre-identified with;

obtaining a first group of data relating to a second field in the alternate template;

using a machine learning algorithm on the first group of data to suggest a second group of ranked data;

prepopulating a third field with the second group of ranked data, wherein the second group of ranked data is modifiable from the third field by removing at least one datum from the third field according to user input; and storing the first group of data in an evolving collection of past data collected from all users.

15. The non-transitory computer-readable medium of claim 14, wherein the form is automatically updated with the alternate template when an identifier associated with the alternate template is selected.

16. The non-transitory computer-readable medium of claim 14, further comprising updating the list after a portion of the default template is filled out.

17. The non-transitory computer-readable medium of claim 14, wherein a user interface of the form is command language based.

18. The non-transitory computer-readable medium of claim 14, wherein a user interface of the form is direct manipulations based.

19. The non-transitory computer-readable medium of claim 14, further comprising, after updating the form with an alternate template selected by a user, reverting the form to the default template.

20. The non-transitory computer-readable medium of claim 14, further comprising:

modifying automatically provided content in the first field with user provided content; and reverting back to an original setting such that the first field includes the automatically but not the user provided content.

\* \* \* \* \*